J. HARPER.
Wheel-Cultivator.
No. 47,016. Patented Mar. 28, 1865.
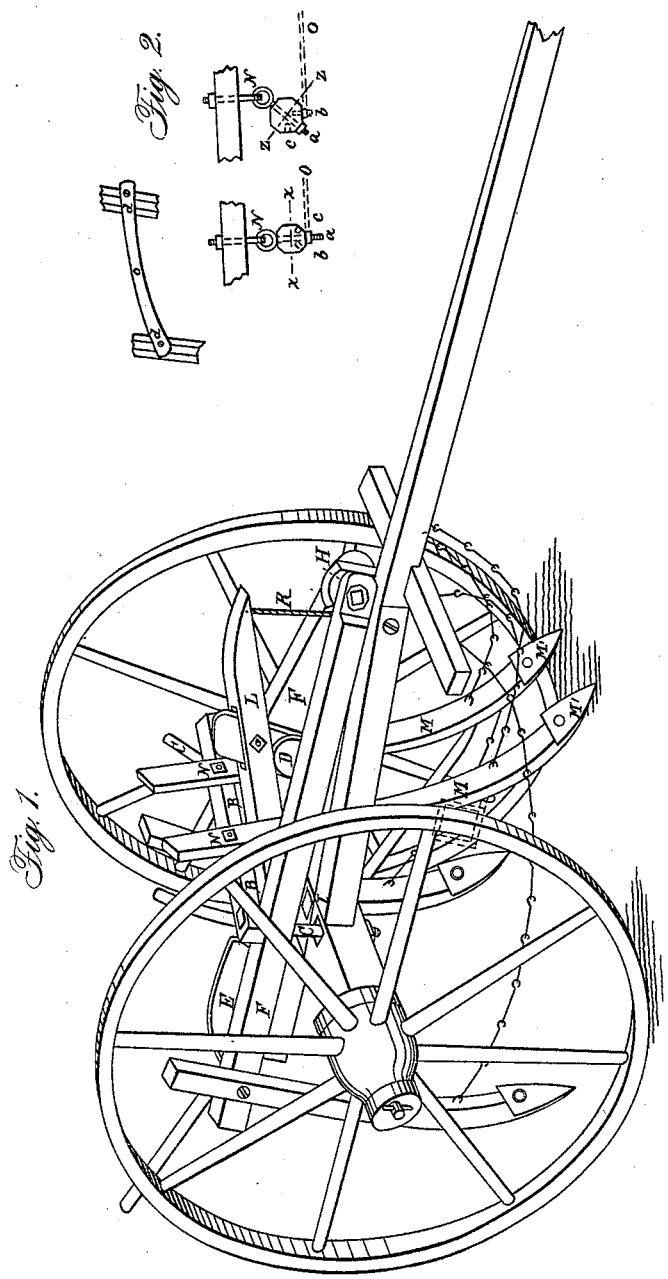
Witnesses:
R. M. Harper.
B. Ebbitt.
Inventor:
John Harper

UNITED STATES PATENT OFFICE.

JOHN HARPER, OF SALEM, IOWA.

IMPROVEMENT IN CORN-CULTIVATORS.

Specification forming part of Letters Patent No. 47,016, dated March 28, 1865.

*To all whom it may concern:*

Be it known that I, JOHN HARPER, of Salem, in the county of Henry and State of Iowa, have invented a new and Improved Corn-Cultivator; and I do hereby declare that the following is a full and exact description thereof, reference being had to the accompanying drawings, and to the letters of reference marked thereon.

The nature of my invention consists in the frame F F, which is hinged on the tongue at H, and easily lifted by the lever L working under the cross-bar B on the fulcrum at D, the rope R being attached to the front end of the lever and brought under the tongue to the driver's seat E, where he controls by that rope the movement in a vertical manner of the four plows. This frame can also be adjusted on the segmental adjustable guide-rods C C from one hole to another, as seen at I, to suit the width of the corn-planter.

The two front shovels, M' M', are attached to the bar B by means of the swivel-joints N N, (shown in Figure 2,) so that the shovels can be turned to the right or left, as shown at *a b c*, in Fig. 2.

The standards M M are connected by means of the brace *o*, Fig. 2, by screws *d*. When these screws *d* are secured, as at *a*, the shovels M' are at right angles to the line of draft, as at X X. When these screws are inserted, as at *b*, the shovels both turn inward, as at Z Z. When inserted, as at *c c*, they both turn outward. In this manner the shovels M may be turned to or from the corn, as desired.

What I claim as my invention, and desire to secure by Letters Patent, is—

1. The frame F F, adjustable on the segmental guide-rods C C, as specified.

2. The manner in which the front shovels are attached to the bar B, turning them to or from the corn, as may be required, in combination with the lever L, substantially as and for purposes set forth.

JOHN HARPER.

Witnesses:
R. M. HARPER,
B. EBBITT.